United States Patent
Ochiai et al.

(10) Patent No.: US 10,029,592 B2
(45) Date of Patent: Jul. 24, 2018

(54) CUSHION BODY

(71) Applicant: TOYOTA BOSHOKU KABUSHIKI KAISHA, Aichi-ken (JP)

(72) Inventors: Mitsuyoshi Ochiai, Aichi-ken (JP); Tetsuo Hayashida, Aichi-ken (JP); Yoshiyuki Murata, Aichi-ken (JP); Yoshihisa Nakagawa, Aichi-ken (JP); Ami Inagaki, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 9 days.

(21) Appl. No.: 15/296,383

(22) Filed: Oct. 18, 2016

(65) Prior Publication Data
US 2017/0113588 A1    Apr. 27, 2017

(30) Foreign Application Priority Data
Oct. 23, 2015 (JP) ................... 2015-208636

(51) Int. Cl.
*B60N 2/58* (2006.01)
*B60N 2/64* (2006.01)
*B60N 2/70* (2006.01)

(52) U.S. Cl.
CPC .......... *B60N 2/646* (2013.01); *B60N 2/5875* (2013.01); *B60N 2/5883* (2013.01); *B60N 2/7017* (2013.01)

(58) Field of Classification Search
CPC .... B60N 2/646; B60N 2/5875; B60N 2/5883; B60N 2/7017
See application file for complete search history.

(56) References Cited

U.S. PATENT DOCUMENTS

| | | | | |
|---|---|---|---|---|
| 5,016,941 A * | 5/1991 | Yokota | ................. | B60N 2/5875 297/452.61 |
| 5,395,473 A * | 3/1995 | Nixon | ................... | B29C 63/22 156/285 |
| 5,669,670 A * | 9/1997 | Haraguchi | ........... | B29C 44/141 297/219.1 |
| 5,733,001 A * | 3/1998 | Roberts | ................ | B60N 2/5825 24/297 |
| 8,821,777 B2 * | 9/2014 | San Miguel | ............. | A47C 7/18 264/225 |

FOREIGN PATENT DOCUMENTS

| | | |
|---|---|---|
| JP | 62-286407 | 12/1987 |
| JP | 2003-225135 | 8/2003 |
| JP | 2005-192635 | 7/2005 |

* cited by examiner

*Primary Examiner* — Philip F Gabler
(74) *Attorney, Agent, or Firm* — Greenblum & Bernstein, P.L.C.

(57) ABSTRACT

A cushion body includes a seat pad; and a seat cover covering a surface of the seat pad in a state in which a surface of the seat cover is bonded to the surface of the seat pad. The seat pad includes a drawing groove into which an intermediate part of the seat cover is drawn such that a surface of the intermediate part of the seat cover is bonded to the drawing groove; and a deformation promoting structure configured to promote bending of a vicinity portion in vicinity of the drawing groove so as to promote bending of one pad portion with respect to another pad portion in a direction in which a groove width of the drawing groove is increased, the one pad portion being separated from the other pad portion by the drawing groove.

11 Claims, 12 Drawing Sheets

CUSHION BODY

INCORPORATION BY REFERENCE

The disclosure of Japanese Patent Application No. 2015-208636 filed on Oct. 23, 2015 including the specification, drawings and abstract is incorporated herein by reference in its entirety.

BACKGROUND OF THE INVENTION

1. Field of the Invention

The present invention relates to a cushion body. More particularly, the present invention relates to a cushion body in which a seat cover covers a surface of a seat pad in a state in which a surface of the seat cover is bonded to the surface of the seat pad.

2. Description of Related Art

Conventionally, there has been known a vehicle seat including a so-called covering-integrated foam-molded cushion body in which a seat pad is foam-molded integrally with a seat cover (Japanese Patent Application Publication No. 2005-192635 (JP 2005-192635 A)). The covering-integrated foam-molded cushion body is molded in a state where the seat cover is directly bonded to the seat pad, and therefore, a recessed portion can be easily formed in the seat cover without the need of pulling the seat cover into the seat pad by a pulling member.

SUMMARY OF THE INVENTION

However, in the conventional technique, the seat cover is integrally bonded to the seat pad over a substantially entire region, and therefore, at the time when the seat cover and the seat pad receive a body pressure from a seated occupant so as to be bent, it is difficult to bend the seat cover and the seat pad because their degrees of freedom in deformation are low as compared to a configuration in which the seat cover and the seat pad are provided separately and are bent in accordance with their individual characteristics.

The present invention makes it possible to promote bending of a cushion body in which a seat cover covers a surface of a seat pad in a state in which a surface of the seat cover is bonded to the surface of the seat pad.

An aspect of the present invention relates to a cushion body including a seat pad; and a seat cover covering a surface of the seat pad in a state in which a surface of the seat cover is bonded to the surface of the seat pad. The seat pad includes a drawing groove into which an intermediate part of the seat cover is drawn such that a surface of the intermediate part of the seat cover is bonded to the drawing groove; and a deformation promoting structure configured to promote bending of a vicinity portion in vicinity of the drawing groove so as to promote bending of one pad portion with respect to another pad portion in a direction in which a groove width of the drawing groove is increased, the one pad portion being separated from the other pad portion by the drawing groove.

With the above configuration, the deformation promoting structure promotes bending of the one pad portion with respect to the other pad portion in the direction in which the groove width of the drawing groove is increased, the one pad portion being separated from the other pad portion by the drawing groove. Accordingly, even in the case where the cushion body is configured to be difficult to deform due to surface-bonding of the seat cover to the seat pad, bending of the cushion body can be promoted by the deformation promoting structure.

In the above aspect, the drawing groove may be formed in a boundary portion between a main surface and a bolster surface in the seat pad; the main surface may be configured to support, from a back side, a body of a seated occupant; and the bolster surface may be configured to protrude with respect to the main surface such that an angle is formed between the bolster surface and the main surface, and to support the body of the seated occupant from a lateral side.

With the above configuration, the deformation promoting structure allows the bolster surface supporting the body of the seated occupant from the lateral side to be bent more flexibly. This accordingly makes it possible to appropriately adjust hardness of a side support portion that supports the body of the seated occupant from the lateral side.

In the above aspect, a bottom face of the drawing groove may be formed in a shape in which the bottom face is extended in a groove-height direction so as to expand a peripheral length of the drawing groove.

With the above configuration, the peripheral length of an inner peripheral surface of the drawing groove can be expanded without changing the groove width of the drawing groove. This makes it possible to more easily bend the cushion body.

In the above aspect, a side face of the drawing groove may be formed in a shape in which the side face is extended in a groove-width direction so as to expand a peripheral length of the drawing groove.

With the above configuration, the peripheral length of the inner peripheral surface of the drawing groove can be expanded without changing the depth of the drawing groove. This makes it possible to more easily bend the cushion body.

In the above aspect, a sewn portion in which cover pieces constituting the seat cover are sewn together may be positioned on a bottom face of the drawing groove.

With the above configuration, it is possible to appropriately draw and fit the seat cover into the drawing groove without strongly exerting an elastic force of the seat cover in a restoring direction. Further, it is possible to use the sewn portion of the seat cover as a fold line to form creases (i.e., it is possible to form creases along the sewn portion) in the drawing groove, which makes it possible to open (widen) the drawing groove with a good appearance.

In the above aspect, the drawing groove may have a shallow region where a groove depth is relatively small and a deep region where the groove depth is relatively large, in a lengthwise direction in which the drawing groove extends in a stripe shape; the deep region of the drawing groove may have an extended groove structure in which the groove depth is extended as compared to the shallow region; and the extended groove structure may constitute the deformation promoting structure that promotes bending of the one pad portion in the direction in which the groove width of the drawing groove is increased.

With the above configuration, the deformation promoting portion can be obtained simply by providing a simple structure in which the drawing groove is formed in a shape in which the drawing groove is partially extended in the depth direction thereof.

In the above aspect, the seat cover may include surface cover pieces that respectively cover the one pad portion and the other pad portion, and groove cover pieces that respectively cover side faces of the drawing groove; a sewn portion in which edge portions of the groove cover pieces are sewn together may be provided on a bottom face of the drawing groove, the edge portions of the groove cover pieces being adjacent to each other, sewn portions may be provided on corner surfaces of the drawing groove on an opening side; and in the sewn portions, opposite edge portions of the groove cover pieces may be sewn to corresponding edge portions of the surface cover pieces that are respectively adjacent to the groove cover pieces.

With the above configuration, it is possible to more appropriately draw and fit the seat cover into the drawing groove without strongly exerting an elastic force of the seat cover in the restoring direction. Further, the sewn portion of the seat cover can be used as a fold line to form creases (i.e., creases are formed along the sewn portion) in the drawing groove, which makes it possible to open (widen) the drawing groove with a good appearance. Further, due to the sewn portions in which the groove cover pieces are respectively sewn to the surface cover pieces, the corner surfaces, on the opening side, of the drawing groove of the seat pad are angular-shaped surfaces with a good appearance.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
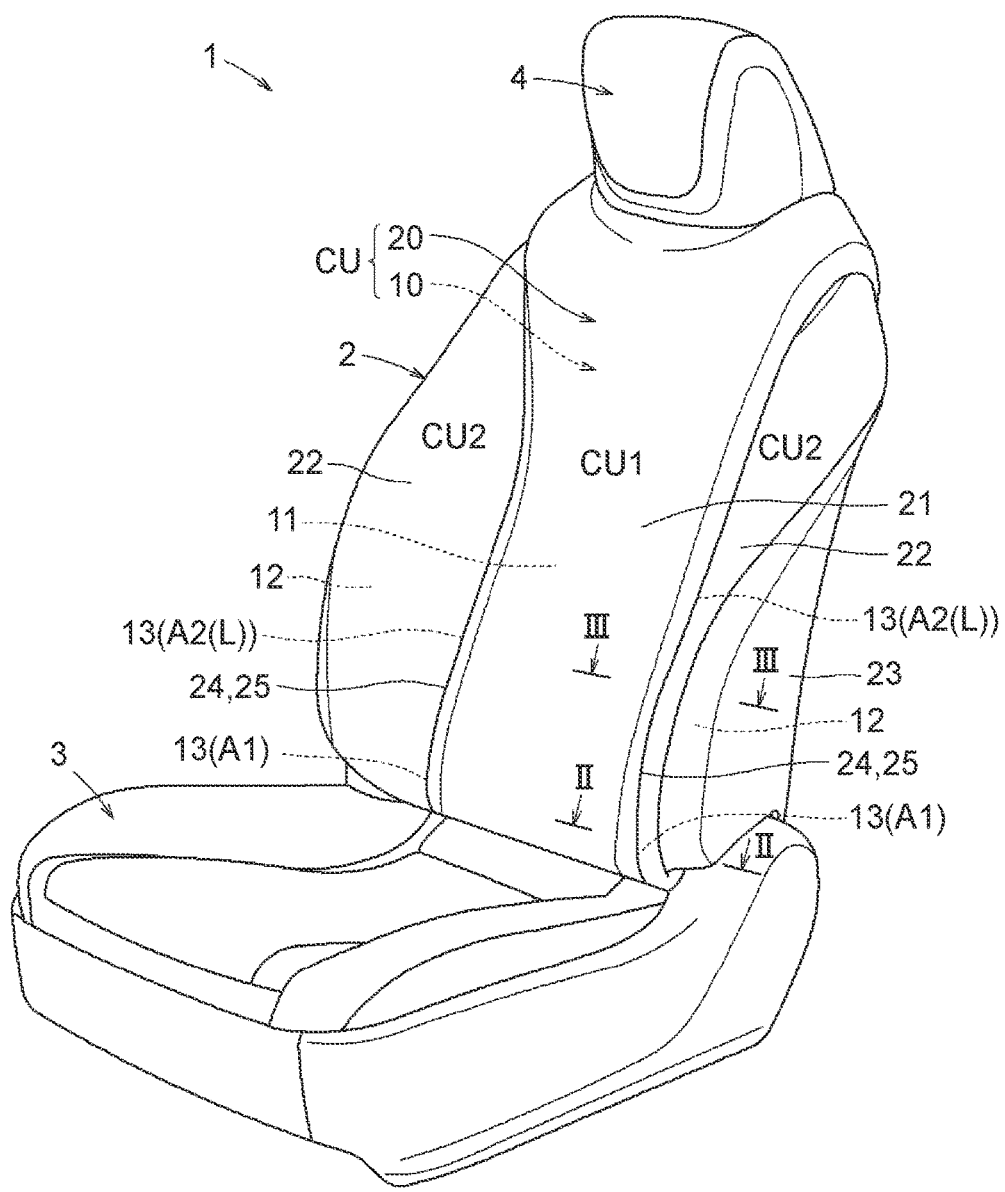
FIG. 1 is a perspective view illustrating a schematic configuration of a vehicle seat to which a cushion body of a first embodiment is applied.

Hereinafter, embodiments of the present invention will be described with reference to the drawings. Note that in the following embodiments, a "cushion body" of the present invention is applied to a vehicle seat.

A configuration of a seat 1, to which a cushion body CU of a first embodiment is applied, will be described with reference to FIGS. 1 to 4. The seat 1 of the present embodiment is configured as a one-person seat for a vehicle (an automobile). The seat 1 includes a seatback 2 serving as a backrest for a seated occupant, a seat cushion 3 serving as a seating portion, and a headrest 4 serving as a head restraint.

The seatback 2 is configured such that the cushion body CU that can softly and elastically receive a backrest load of the seated occupant is fitted to a metal back frame (not shown) constituting an inner framework of the seatback 2. The cushion body CU includes a back pad 10 made of urethane foam, and a back cover 20 that is made of synthetic leather and covers a surface of the back pad 10 in a state in which the back cover 20 is integrally surface-bonded to the surface of the back pad 10 (i.e., a surface of the back cover 20 is integrally bonded to the surface of the back pad 10). The back pad 10 may be regarded as a "seat pad" of the present invention, and the back cover 20 may be regarded as a "seat cover" of the present invention.

The cushion body CU is formed by a so-called covering-integrated foam molding method. More specifically, the back cover 20 is set in a foam molding die (not shown) for the back pad 10, and foam molding of the back pad 10 is performed on the back cover 20 by mold clamping. Thus, the back pad 10 is molded so as to be integrally bonded to the back cover 20. In the cushion body CU molded by the above-described manufacturing method, the back cover 20 can cover the back pad 10 along an uneven surface shape of the back pad 10 such that the back cover 20 is stretched (taut), the back cover 20 is in close contact with the back pad 10, and the back cover 20 is prevented from separating from the back cover 20 and from becoming wrinkled, without the need of pulling the back cover 20 by a pulling member.

However, the cushion body CU molded by the above manufacturing method is configured such that the back cover 20 deforms together with the back pad 10. Accordingly, as compared to a simple covering configuration in which the back cover 20 and the back pad 10 are not bonded integrally, their individual degrees of freedom in deformation are easily lost, which makes it difficult to bend the cushion body CU as a whole. Further, the cushion body CU molded by the above manufacturing method is in a state where a back surface of the back cover 20 is partially impregnated with a foaming material of the back pad 10 and the foaming material is hardened. Accordingly, the back cover 20 and the back pad 10 are integrally bonded appropriately, while a surface hardness of the finished cushion body CU tends to be high. Accordingly, in order that an appropriate supporting pressure can be exerted at each part of the cushion body CU having the above-described characteristics, it is necessary to impart appropriate flexibility to a part desired to have appropriate flexibility.

In view of this, in the present embodiment, a structure that promotes deformation of the back pad 10 is applied to the part desired to have appropriate flexibility in the cushion body CU, and thus, appropriate flexibility is imparted to the part. More specifically, the cushion body CU includes a center support portion CU1 that supports a body of a seated occupant from a back side, and side support portions CU2 that extend in a shape bulging obliquely forward and outward from right and left side parts of the center support portion CU1 so as to support the body of the seated occupant from both lateral sides.

The side support portion CU2 functions to support and hold the body of the seated occupant from the lateral side at the time when the seated occupant leans against the backrest in a normal time and at the time when the vehicle is cornering. However, when supporting forces of the side support portions CU2 are extremely strong, the seated occupant may have a feeling of side pressure or a tight feeling. Further, in a case where the seated occupant has a large body size, if the supporting forces of the side support portions CU2 are extremely strong, it may be difficult for the body of the seated occupant to be fitted between the side support portions CU2. In view of this, in order to deal with such situations appropriately, the side support portions CU2 are configured to be bent outward relative to the center support portion CU1 with appropriate flexibility.

A specific configuration of each part of the cushion body CU will be described below in detail. A configuration of the back pad 10 constituting the cushion body CU will be described with reference to FIGS. 2 to 3. The back pad 10 is constituted as a cushion member forming a basic outer shape of the cushion body CU. More specifically, the back pad 10 has a shape constituted by a main pad portion 11 forming the center support portion CU1 of the cushion body CU, and side pad portions 12 extending in a shape bulging obliquely forward and outward from right and left side parts of the main pad portion 1 so as to form respective side support portions CU2 of the cushion body CU.

In the main pad portion 11, a front surface, which is a surface of the main pad portion 11, serves as a main surface 11A, and is formed to be a flat surface that makes surface contact with, and supports the body of the seated occupant straight from a rear side. Further, the side pad portions 12 are formed such that the side pad portions 12 extend in a shape bulging obliquely in a mountain shape toward front outer sides from right and left side parts of the main pad portion 11. Respective inclined surfaces of the side pad portions 12 face obliquely inward and extend and protrude obliquely toward the front outer sides from the main surface 11A. The respective inclined surfaces serve as bolster surfaces 12A that contact the body of the seated occupant from a back side and obliquely outer sides and support the body of the seated occupant from the both lateral sides. Further, respective side faces extending rearward from respective distal edge portions of the protruding bolster surfaces 12A of the side pad portions 12 serve as peripheral side faces 12B and form right and left side faces of the cushion body CU.

Figure 2:
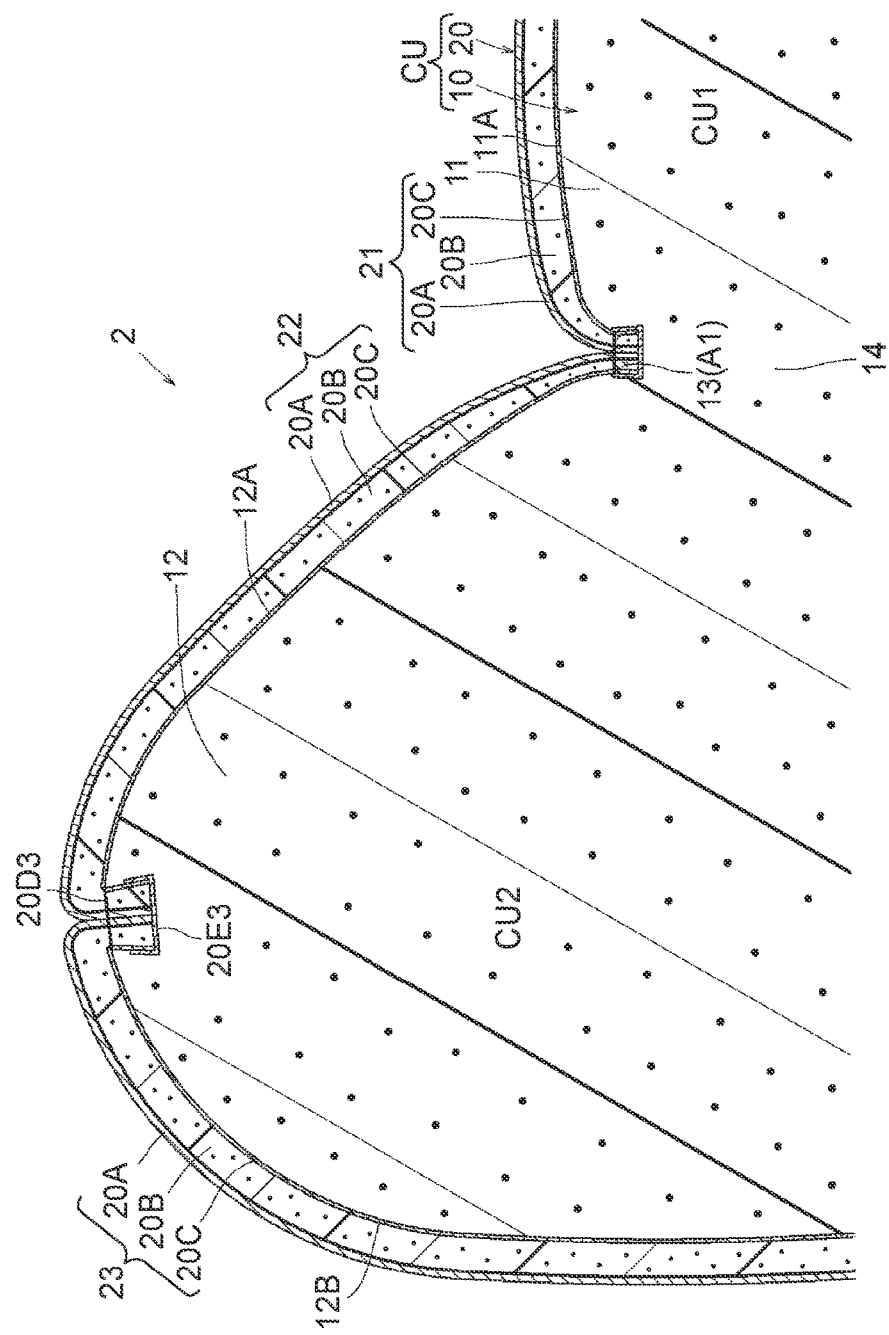
FIG. 2 is a sectional view taken along a line II-II in FIG. 1.
Figure 3:
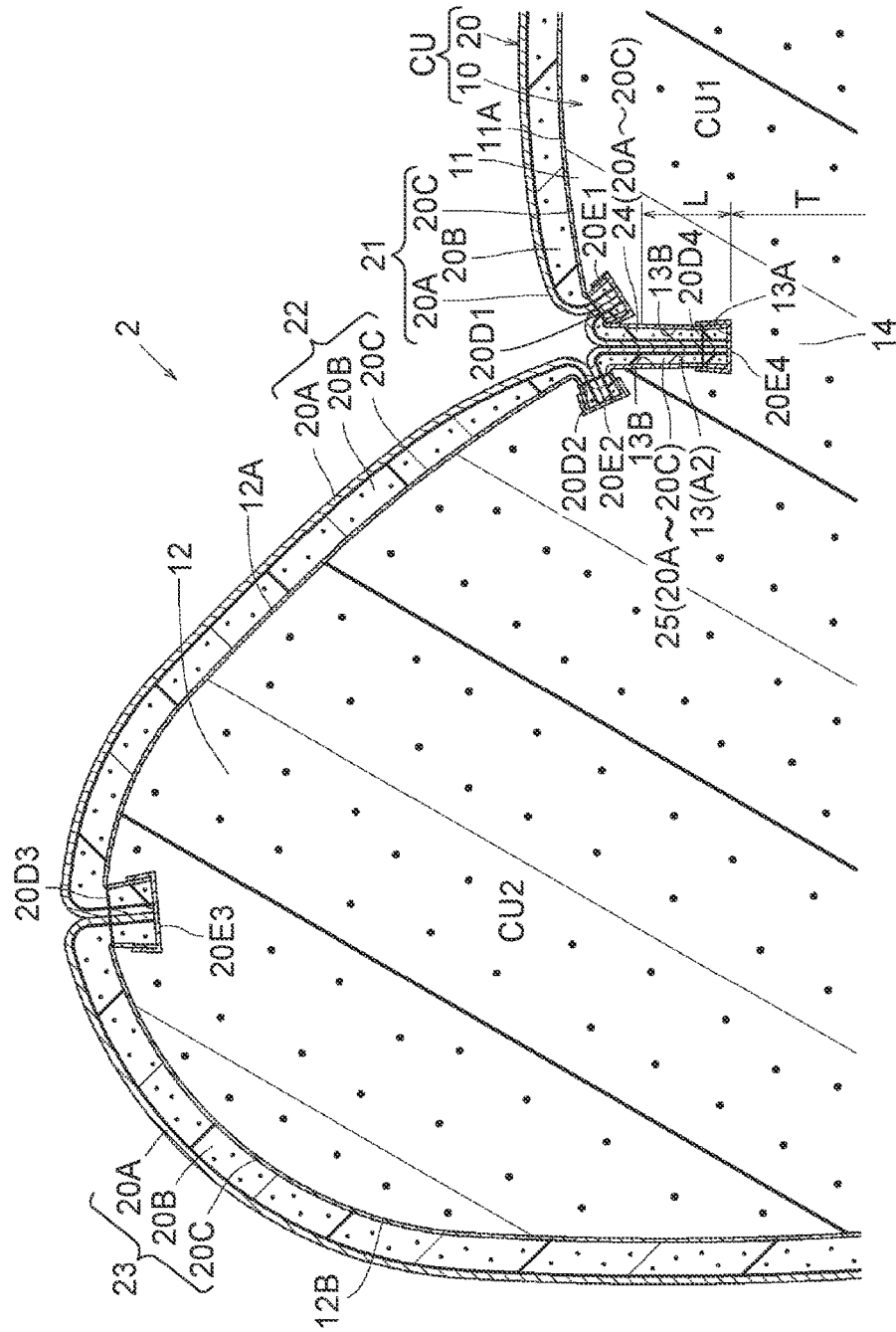
FIG. 3 is a sectional view taken along a line III-III in FIG. 1.

As illustrated in FIGS. 1 and 3, each of the side pad portions 12 has a shape in which the protruding amount of the side pad portion 12 bulging obliquely toward the front outer side is largest in an intermediate region in a height direction. The intermediate regions contact a lumbar part of the seated occupant from both lateral sides. Further, as illustrated in FIGS. 1 and 2, the side pad portions 12 are formed such that their bulging amounts toward the front outer sides are gradually decreased toward upper and lower sides from the intermediate regions in which the protruding amounts are largest. With this shape, the side pad portions 12 can hold the lumbar part of the seated occupant from both lateral sides appropriately, and the side pad portions 12 are also formed in a shape that hardly causes a feeling of side pressure or a tight feeling to shoulders or underarms of the seated occupant and hardly obstructs a lateral movement of the seated occupant at the time of getting in or out the vehicle.

A drawing groove 13 is formed in a boundary portion between the main pad portion 11 and each of the side pad portion 12. The drawing groove 13 is provided along the boundary portion such that the back cover 20 covering surfaces of the main pad portion 11 and the side pad portion 12 is partially drawn into the drawing groove 13 so as to be integrally surface-bonded to the drawing groove 13 in a state where the back cover 20 is partially folded in a V-shape. As illustrated in FIGS. 1 and 2, in regions formed in upper and lower end portions where the protruding amount of the side pad portion 12 is small, the drawing groove 13 is formed as a shallow region A1 having such a groove depth that only a V-shaped folded end of the back cover 20 can be accommodated.

In contrast, as illustrated in FIGS. 1 and 3, in the intermediate region in the height direction at which the protruding amount of the side pad portion 12 is large, the drawing groove 13 is formed as a deep region A2 having an extended groove structure L where the V-shaped folded end of the back cover 20 is drawn to a deep position. With this configuration, the side pad portion 12 is easily bent outward in such a manner that the drawing groove 13 is opened (widened) in a groove-width direction, because the intermediate region of the side pad portion 12 in the height direction where the protruding amount is large has a deep cut with the extended groove structure L of the drawing groove 13 (see FIG. 4). The main pad portion 11 may be regarded as "the other pad portion" of the present invention, and the side pad portion 12 may be regarded as "one pad portion" of the present invention. Further, the extended groove structure L may be regarded as a "deformation promoting structure" of the present invention.

Next will be described a configuration of the back cover 20 with reference to FIGS. 1 to 3. The back cover 20 is formed such that a plurality of cover pieces cut in suitable shapes for respective surfaces of the back pad 10 is sewed up in a single bag shape. More specifically, as illustrated in FIG. 3, the back cover 20 is configured such that a cover structure that covers an intermediate region of the back pad 10 in the height direction includes a main cover piece 21 covering the main surface 11A of the back pad 10, bolster cover pieces 22 covering the respective bolster surfaces 12A, frame cover pieces 23 covering the respective peripheral side faces 12B, groove inner cover pieces 24 covering respective inner side faces 13B of the drawing grooves 13, and groove outer cover pieces 25 covering respective outer side faces 13B of the drawing grooves 13. These pieces are sewn up so as to form a single bag shape.

Note that, in other regions, the back cover 20 has a cover structure constituted by a combination of cover pieces different from the above-described combination, but descriptions on concrete configurations thereof are omitted herein. Each of the main cover piece 21 and the bolster cover pieces 22 may be regarded as a "surface cover piece" of the present invention. Further, each of the groove inner cover pieces 24 and the groove outer cover pieces 25 may be regarded as a "groove cover piece" of the present invention.

The cover pieces (the main cover piece 21, the bolster cover pieces 22, the frame cover pieces 23, the groove inner cover pieces 24, and the groove outer cover pieces 25) that constitute the back cover 20 described above are each constituted by a three-layer cover structure including a covering material 20A made of synthetic leather, a laminating pad 20B made of urethane foam integrally surface-bonded to a back surface of the covering material 20A, and a back base fabric 20C made of non-woven fabric integrally surface-bonded to a back surface of the laminating pad 20B. The cover pieces that constitute the back cover 20 are sewed up so as to form a single bag shape as described above, and in this state, the cover pieces are set in a foam molding die (not shown) for the back pad 10 and foam molding of the back pad 10 is performed. Thus, a foaming material of the back pad 10 is hardened in a state where the back base fabric 20C and the laminating pad 20B are partially impregnated with the foaming material. Thus, the back cover 20 is molded such that the back cover 20 is integrally surface-bonded to the back pad 10 (i.e., the surface of the back cover 20 is integrally bonded to the surface of the back pad 10).

The main cover piece 21 is configured such that edge portions facing the drawing grooves 13 on both right and left sides thereof are sewn to respective edge portions, on the opening side, of the groove inner cover pieces 24 covering the respective inner side faces 13B of the drawing grooves 13 in a state where the main cover piece 21 and the groove inner cover pieces 24 overlap each other on a back side (sewn portions 20D1). The sewn portion 20D1 in which the main cover piece 21 and the groove inner cover piece 24 are sewn together is provided so as to extend along a corner surface of the drawing groove 13 on an opening side. Respective margins of the main cover piece 21 and the groove inner cover piece 24 that are sewn together and extend toward the back side are provided so as to be integrally embedded in the back pad 10 due to integral foam molding with the back pad 10. A protective film 20E1 is provided in the sewn portion 20D1 in which the main cover piece 21 and the groove inner cover piece 24 are sewn together, so as to cover and wrap the margins. The protective film 20E1 prevents the foaming material from leaking from a seam at the time of foam molding of the back pad 10.

Further, the bolster cover piece 22 is configured such that an edge portion facing the drawing groove 13 is sewn to an edge portion, on the opening side, of the groove outer cover piece 25 covering the outer side face 13B of the drawing groove 13 such that the bolster cover piece 22 and the groove outer cover piece 25 overlap each other on the back side (a sewn portion 20D2). The sewn portion 20D2 in which the bolster cover piece 22 and the groove outer cover piece 25 are sewn together is provided so as to extend along a corner surface of the drawing groove 13 on the opening side. Respective margins of the bolster cover piece 22 and the groove outer cover piece 25 that are sewn together and extend toward the back side are provided so as to be integrally embedded in the back pad 10 due to integral foam molding with the back pad 10. A protective film 20E2 is provided in the sewn portion 20D2 in which the bolster cover piece 22 and the groove outer cover piece 25 are sewn, so as to cover and wrap the margins. The protective film 20E2 prevents the foaming material from leaking from a seam at the time of foam molding of the back pad 10.

Further, the bolster cover piece 22 is configured such that an edge portion facing the peripheral side face 12B of the back pad 10 is sewn to an adjacent edge portion of the frame cover piece 23 covering the peripheral side face 12B such that the bolster cover piece 22 and the frame cover piece 23 overlap each other on the back side (a sewn portion 20D3). The sewn portion 20D3 in which the bolster cover piece 22 and the frame cover piece 23 are sewn together is provided so as to extend substantially along a corner surface of a boundary between the bolster surface 12A and the peripheral side face 12B. Respective margins of the bolster cover piece 22 and the frame cover piece 23 that are sewn together and extend toward the back side are provided so as to be integrally embedded in the back pad 10 due to integral foam molding with the back pad 10. A protective film 20E3 is provided in the sewn portion 20D3 in which the bolster cover piece 22 and the frame cover piece 23 are sewn together, so as to cover and wrap the margins. The protective film 20E3 prevents the foaming material from leaking from a seam at the time of foam molding of the back pad 10.

Further, the groove inner cover piece 24 covering the inner side face 13B of the drawing groove 13 and the groove outer cover piece 25 covering the outer side face 13B of the drawing groove 13 are configured such that their respective edge portions drawn to a bottom face 13A of the drawing groove 13 are sewn together in an overlapping manner (a sewn portion 20D4). The sewn portion 20D4 in which the groove inner cover piece 24 and the groove outer cover piece 25 are sewn together is provided so as to extend along the bottom face 13A of the drawing groove 13. Respective margins of the groove inner cover piece 24 and the groove outer cover piece 25 that are sewn together and extend toward the back side are provided so as to be integrally embedded in the back pad 10 due to integral foam molding with the back pad 10. A protective film 20E4 is provided in the sewn portion 20D4 in which the groove inner cover piece 24 and the groove outer cover piece 25 are sewn together, so as to cover and wrap the margins. The protective film 20E4 prevents the foaming material from leaking from a seam at the time of foam molding of the back pad 10.

Note that the back cover 20 is provided such that, in the shallow region A1, of the drawing groove 13, formed in the upper and lower end portions where the protruding amount of the side pad portion 12 is small as described in FIG. 2, the edge portion of the main cover piece 21 on each side and an adjacent edge portion of the bolster cover piece 22 provided on the same side are sewn up directly and drawn into the drawing groove 13 so as to be integrally surface-bonded to an inner peripheral surface of the drawing groove 13. That is, the groove inner cover pieces 24 and the groove outer cover piece 25 as described in FIG. 3 are not provided.

Figure 4:
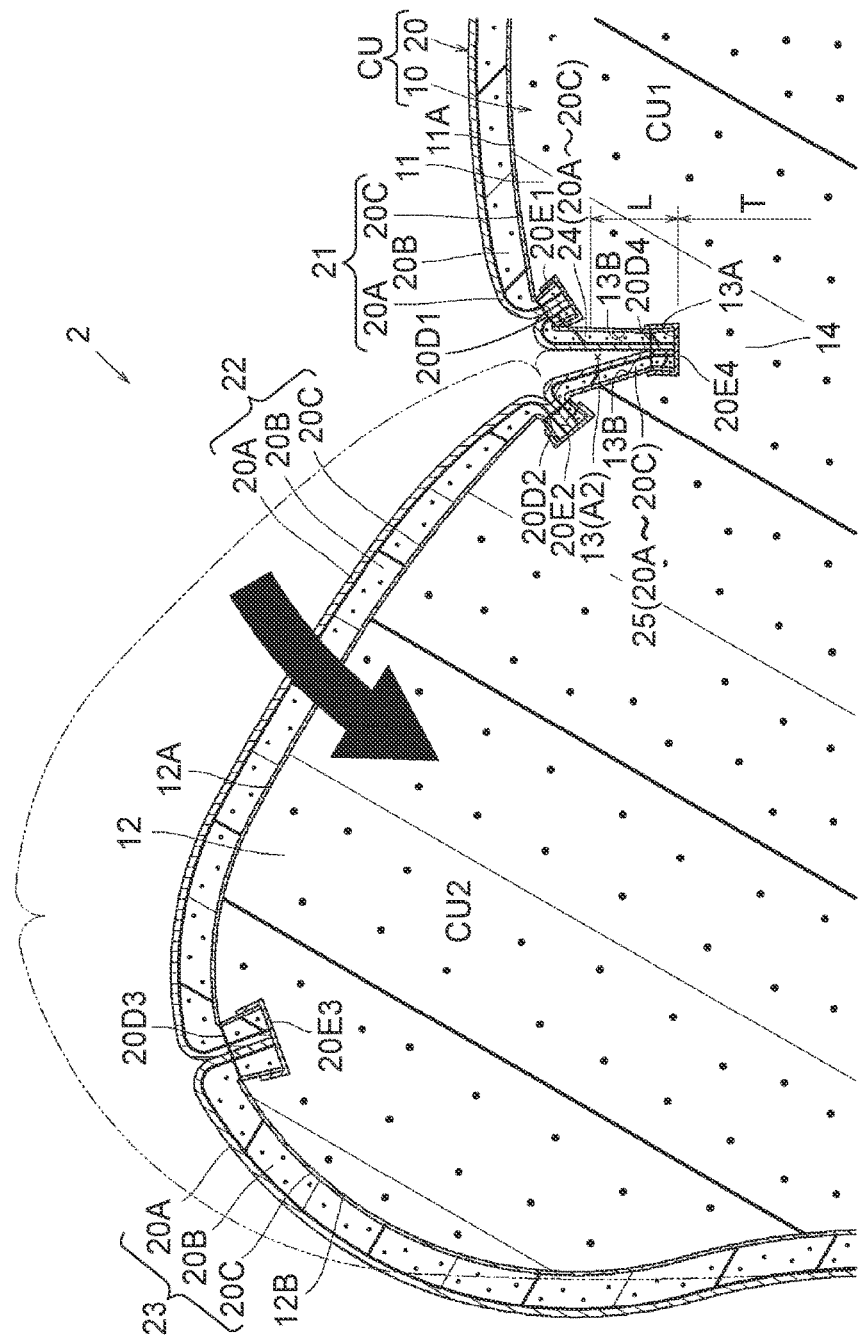
FIG. 4 is a sectional view illustrating a state where a side support portion is bent outward from the state illustrated in FIG. 3.

In the cushion body CU configured as described above, in the intermediate region in the height direction in which the protruding amount of the side pad portion 12 is large, the drawing groove 13 is formed in the boundary portion between the side pad portion 12 and the main pad portion 11 as the deep region A2 having the extended groove structure L as described above in FIG. 3. Accordingly, as illustrated in FIG. 4, the side pad portion 12 is easily bent in a direction (outer side) in which a groove width of the drawing groove 13 is increased. More specifically, the drawing groove 13 is formed in a shape deeply recessed due to the extended groove structure L as described above. As a result, a joining portion 14 of the back pad 10 at which the main pad portion 11 is joined to the side pad portion 12 behind the drawing groove 13 has a thinned thickness T in a front-rear direction. With this configuration, at the time when the side pad portion 12 is pushed and bent outward, an action of a deformation resistance of the joining portion 14 that receives a pushing load on the back side of the side pad portion 12 is decreased, which prevents the joining portion 14 from interfering with the deformation. This makes it possible to easily bend the side pad portion 12 outward. The joining portion 14 may be regarded as a "vicinity portion" of the present invention.

Further, in the cushion body CU, the sewn portion 20D4 in which the groove inner cover piece 24 and the groove outer cover piece 25 are sewn together is positioned on the bottom face 13A of the drawing groove 13. Accordingly, when the drawing groove 13 is opened (widened) in the groove-width direction, mating faces of the groove inner cover piece 24 and the groove outer cover piece 25 form a tapered groove shape. That is, the mating faces of the groove inner cover piece 24 and the groove outer cover piece 25 form a groove shape with a good appearance such that the bottom face shape of the drawing groove 13 is hardly seen from outside.

Accordingly, when the above description is summarized, the cushion body CU of the present embodiment has the following configuration. That is, the cushion body CU is configured such that a seat cover (the back cover 20) covers the surface of a seat pad (the back pad 10) in a surface-bonded state in which the surface of the seat cover is bonded to the surface of the seat pad. The seat pad (the back pad 10) includes: the drawing groove 13 into which an intermediate part of the seat cover (the back cover 20) is drawn such that the intermediate part of the seat cover is surface-bonded to the drawing groove 13 (i.e., a surface of the intermediate part of the seat cover is bonded to the drawing groove 13); and a deformation promoting structure (the extended groove structure L) that facilitates bending of a vicinity portion (the joining portion 14) in vicinity of the drawing groove 13 so as to facilitate bending of one pad portion (the side pad portion 12) with respect to the other pad portion (the main pad portion 11) in a direction in which the groove width of the drawing groove 13 is increased, the one pad portion being separated from the other pad portion by the drawing groove 13.

With this configuration, the deformation promoting structure (the extended groove structure L) facilitates bending of the one pad portion (the side pad portion 12) with respect to the other pad portion (the main pad portion 11) in the direction in which the groove width of the drawing groove 13 is increased, the one pad portion being separated from the other pad portion by the drawing groove 13. Accordingly, even in the case where the cushion body CU is difficult to deform due to surface-bonding of the seat cover (the back cover 20) to the seat pad (the back pad 10), the cushion body CU can be easily bent (i.e., bending of the cushion body CU is promoted) by the deformation promoting structure (the extended groove structure L).

Further, the drawing groove 13 is formed in the boundary portion between the main surface 11A and the bolster surface 12A in the seat pad (the back pad 10). The main surface 11A is configured to support, from the back side, the body of the seated occupant. The bolster surface 12A is configured to protrude with respect to the main surface 11A such that an angle is formed between the bolster surface 12A and the main surface 11A, and to support the body of the seated occupant from the lateral side. With this configuration, due to the deformation promoting structure (the extended groove structure L), the bolster surface 12A that supports the body of the seated occupant from the lateral side can be bent more flexibly. This accordingly makes it possible to appropriately adjust hardness of the side support portion CU2 that supports the body of the seated occupant from the lateral side.

Further, a sewn portion in which cover pieces that constitute the seat cover (the back cover 20) are sewn together (the sewn portion 20D4 in which the groove inner cover piece 24 and the groove outer cover piece 25 are sewn together) is positioned on the bottom face 13A of the drawing groove 13. With this configuration, it is possible to appropriately draw and fit the seat cover (the back cover 20) into the drawing groove 13 without strongly exerting an elastic force of the seat cover (the back cover 20) in a restoring direction. Further, it is possible to use the sewn portion 20D4 of the seat cover (the back cover 20) as a fold line to form creases (i.e., it is possible to form creases along the sewn portion 20D4) in the drawing groove 13, which makes it possible to open (widen) the drawing groove 13 with a good appearance.

Further, in a lengthwise direction (the height direction) where the drawing groove 13 extends in a stripe shape, the drawing groove 13 has the shallow region A1 (see FIG. 2) where the groove depth is relatively small and the deep region A2 (see FIG. 3) where the groove depth is relatively large. The deep region A2 of the drawing groove 13 has the extended groove structure L in which the groove depth is extended as compared to the shallow region A1. The extended groove structure L constitutes the deformation promoting structure that promotes bending of the one pad portion (the side pad portion 12) in the direction in which the groove width of the drawing groove 13 is increased. Thus, the deformation promoting portion can be obtained simply by providing the simple structure in which the drawing groove 13 is partially extended in its depth direction.

Further, the seat cover (the back cover 20) includes: the surface cover pieces (the main cover piece 21 and the bolster cover piece 22) that respectively cover the one pad portion (the side pad portion 12) and the other pad portion (the main pad portion 11); and the groove cover pieces (the groove inner cover piece 24 and the groove outer cover piece 25) that respectively cover the side faces 13B of the drawing groove 13. The sewn portion 20D4 in which edge portions of the groove cover pieces (the groove inner cover piece 24 and the groove outer cover piece 25) are sewn together is provided on the bottom face 13A of the drawing groove 13, the edge portions of the groove cover pieces being adjacent to each other. The sewn portions 20D1, 20D2 are provided on corner surfaces of the drawing groove 13 on the opening side. In the sewn portions 20D1, 20D2, opposite edge portions of the groove cover pieces (the groove inner cover piece 24 and the groove outer cover piece 25) are sewn to corresponding edge portions of the surface cover pieces (the main cover piece 21 and the bolster cover piece 22) that are respectively adjacent to the groove cover pieces.

With this configuration, it is possible to appropriately draw and fit the seat cover (the back cover 20) into the drawing groove 13 without strongly exerting an elastic force of the seat cover (the back cover 20) in the restoring direction. Further, the sewn portion 20D4 of the seat cover (the back cover 20) can be used as a fold line to form creases (i.e., creases are formed along the sewn portion 20D4) in the drawing groove 13, which makes it possible to open (widen) the drawing groove 13 with a good appearance. Further, due to the sewn portions 20D1, 20D2 in which the groove cover pieces (the groove inner cover piece 24 and the groove outer cover piece 25) are respectively sewn to the surface cover pieces (the main cover piece 21 and the bolster cover piece 22), the corner surfaces, on the opening side, of the drawing groove 13 of the seat pad (the back pad 10) are angular-shaped surfaces with a good appearance.

Figure 5:
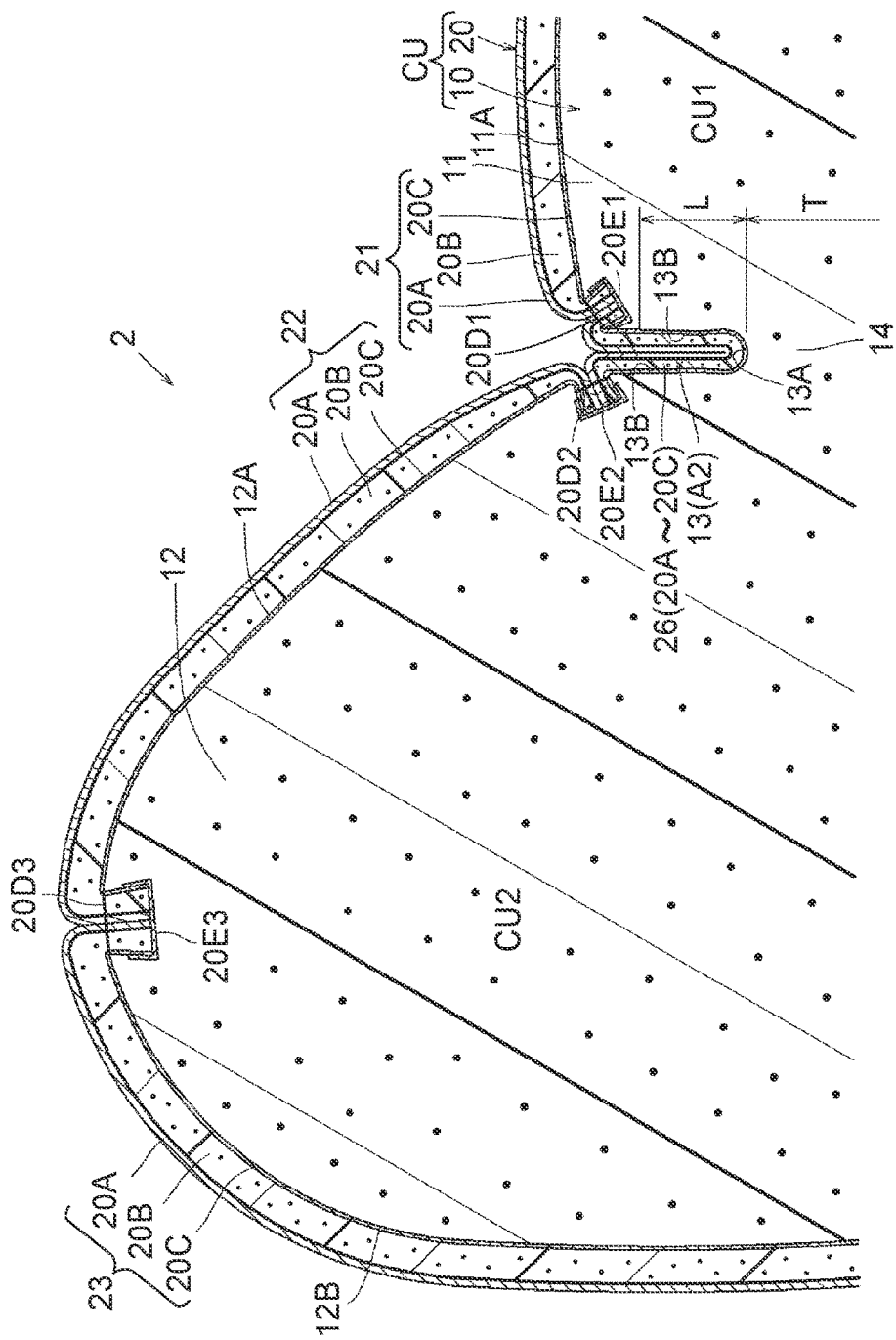
FIG. 5 is a sectional view corresponding to FIG. 3, FIG. 5 illustrating a structure of a main part of a cushion body of a second embodiment.
Figure 6:
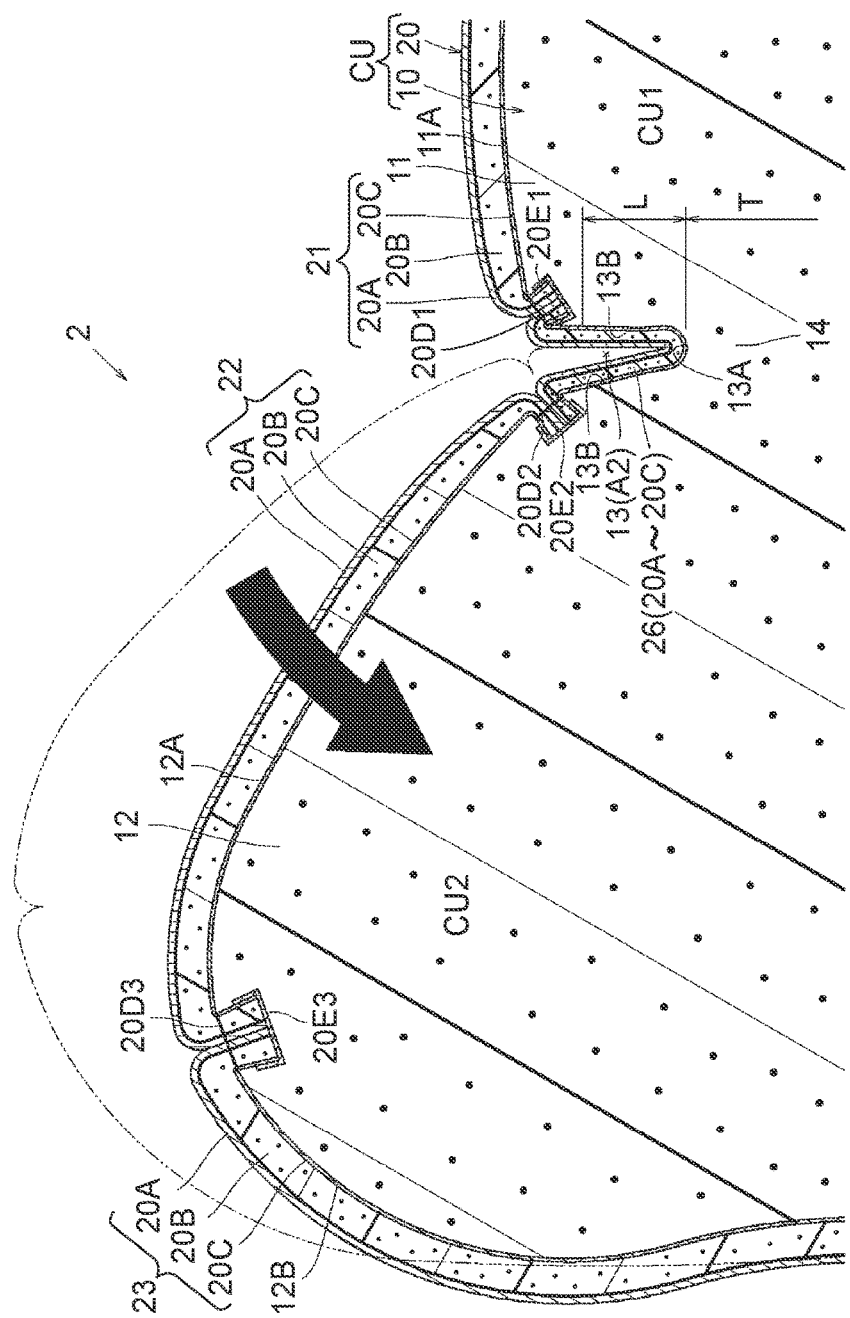
FIG. 6 is a sectional view illustrating a state where a side support portion is bent outward from the state illustrated in FIG. 5.

Subsequently a configuration of a cushion body CU of a second embodiment will be described with reference to FIGS. 5 to 6. In the present embodiment, as illustrated in FIG. 5, a cover piece of a back cover 20 (a seat cover), which is folded in a V-shape and drawn into a drawing groove 13, is constituted by one groove cover piece 26. The groove cover piece 26 has a three-layer cover structure including a covering material 20A made of synthetic leather, a laminating pad 20B made of urethane foam integrally surface-bonded to a back surface of the covering material 20A, and a back base fabric 20C made of non-woven fabric integrally surface-bonded to a back surface of the laminating pad 20B, similarly to the other cover pieces. In the cushion body CU in which the back cover 20 is configured as described above, due to the aforementioned deformation promoting structure having the extended groove structure L of the drawing groove 13 as illustrated in FIG. 6, a side pad portion 12 (one pad portion) can be easily bent with respect to a main pad portion 11 (the other pad portion) in a direction in which a groove width of the drawing groove 13 is increased (i.e., the deformation promoting structure promotes bending of the side pad portion 12 with respect to the main pad portion 11 in the direction in which the groove width of the drawing groove 13 is increased). The other configurations are the same as those of the cushion body CU described in the first embodiment, so the same reference signs are assigned to them and descriptions thereof are omitted.

Figure 7:
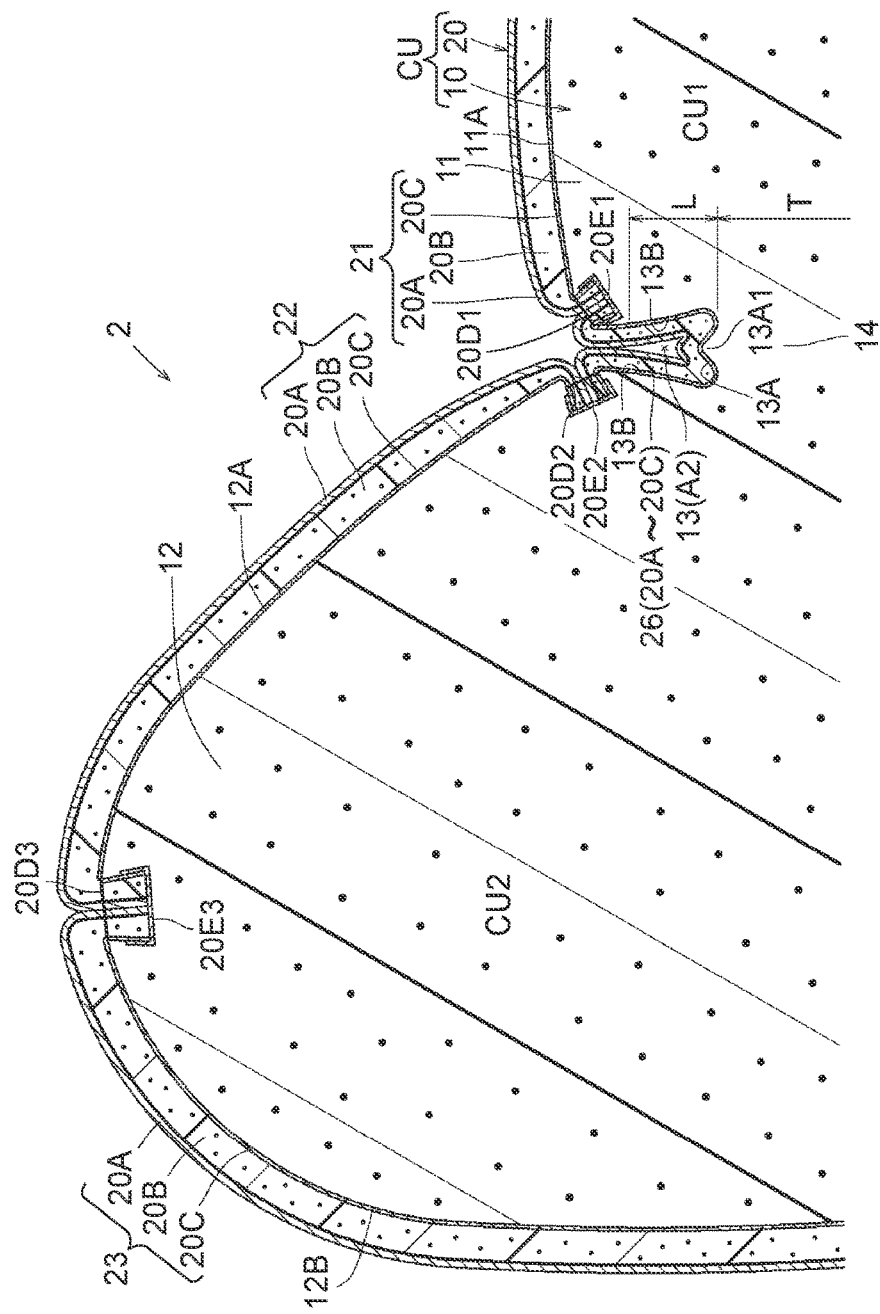
FIG. 7 is a sectional view corresponding to FIG. 3, FIG. 7 illustrating a structure of a main part of a cushion body of a third embodiment.
Figure 8:
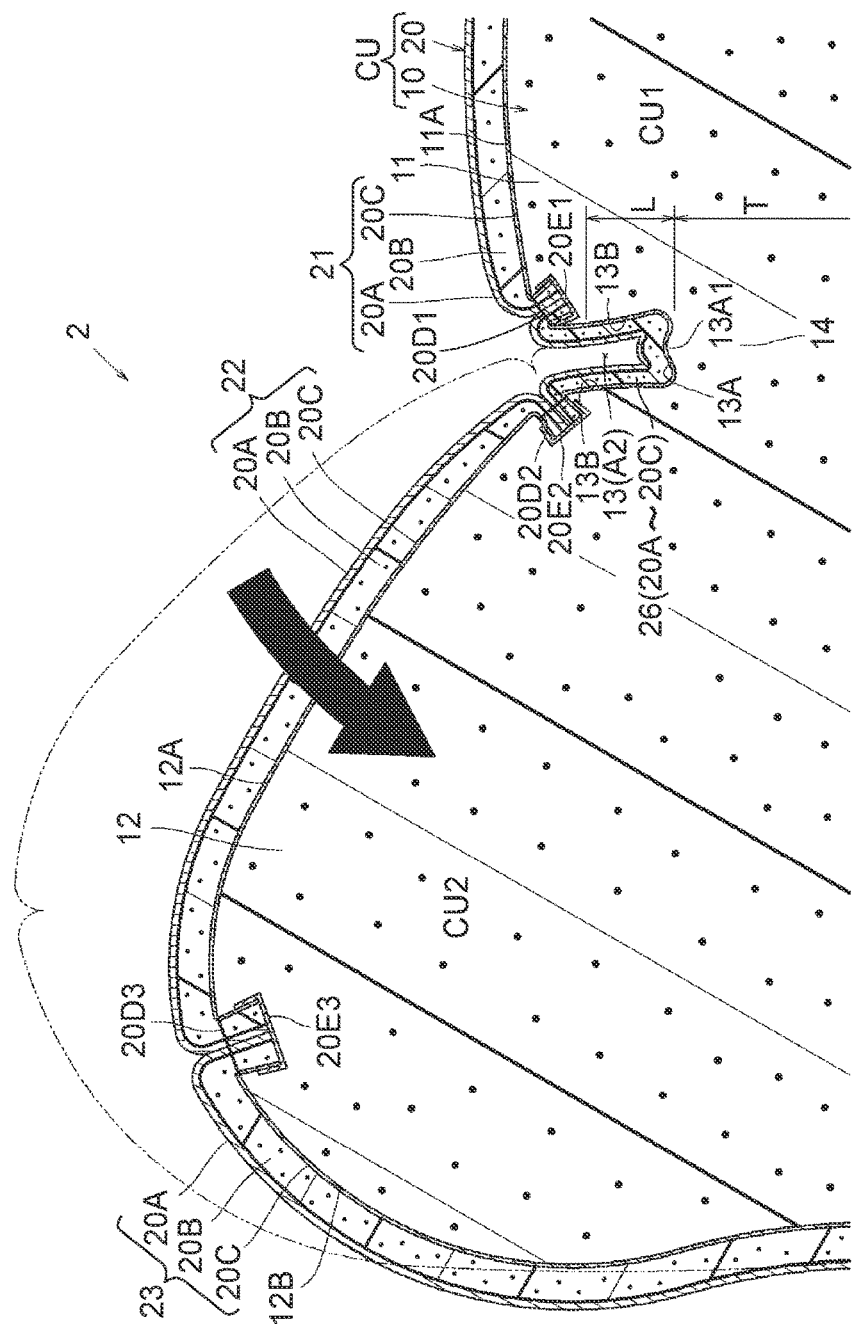
FIG. 8 is a sectional view illustrating a state where a side support portion is bent outward from the state illustrated in FIG. 7.

Subsequently, a configuration of a cushion body CU of a third embodiment will be described with reference to FIGS. 7 to 8. In the present embodiment, as illustrated in FIG. 7, a cover piece of a back cover 20 (a seat cover), which is folded in a V-shape and drawn into a drawing groove 13, is constituted by one groove cover piece 26. The groove cover piece 26 has a three-layer cover structure including a covering material 20A made of synthetic leather, a laminating pad 20B made of urethane foam integrally surface-bonded to a back surface of the covering material 20A, and a back base fabric 20C made of non-woven fabric integrally surface-bonded to a back surface of the laminating pad 20B, similarly to the other cover pieces.

A back pad 10 (a seat pad) is formed to have a transverse sectional shape in which a bottom face 13A of the drawing groove 13 has a mountain face portion 13A in a mountain shape bulging from both ends to a center in a groove-width direction. The mountain face portion 13A1 is formed in a shape bulging uniformly along a lengthwise direction in which the drawing groove 13 extends in a stripe shape. Further, along with this configuration, a part of the groove cover piece 26 on the bottom face 13A of the drawing groove 13 has a mountain shape curved along the shape of the mountain face portion 13A1, and is provided so as to be integrally surface-bonded to the mountain face portion 13A1.

Thus, the cushion body CU is configured such that a peripheral length of the bottom face 13A of the drawing groove 13 is expanded in a groove-height direction due to a bulging shape of the mountain face portion 13A1, without changing a groove width of the drawing groove 13 of the back pad 10. Note that the groove cover piece 26 covering the drawing groove 13 along the mountain face portion 13A1 is also configured such that a peripheral length of the groove cover piece 26 is expanded along the mountain face portion 13A1. Accordingly, as illustrated in FIG. 8, the cushion body CU configured as described above has a configuration in which the peripheral length of the drawing groove 13 is expanded in the groove-height direction due to the mountain face portion 13A1, in addition to the deformation promoting structure having the extended groove structure L of the drawing groove 13. Thus, the side pad portion 12 (one pad portion) can be easily bent with respect to the main pad portion 11 (the other pad portion) in a direction where a groove width of the drawing groove 13 is increased.

More specifically, at the time when the side pad portion 12 is bent outward with respect to the main pad portion 11, the bottom face 13A of the drawing groove 13 can be stretched outward so as to moderate the shape of the mountain face portion 13A1 bulging in a mountain shape. This appropriately decreases an action of a deformation resistance of a joining portion 14, thereby allowing the side pad portion 12 to be easily bent outward. The other configurations are the same as those of the cushion body CU described in the first embodiment, so the same reference signs are assigned to them and descriptions thereof are omitted.

Note that, in the present embodiment, the mountain face portion 13A1 that expands the peripheral length of the drawing groove 13 in the groove-height direction is applied to the configuration in which the drawing groove 13 has the extended groove structure L (the deformation promoting structure). Due to the configuration of the mountain face portion 13A1, the deformation of the cushion body CU is easily promoted. In view of this, the mountain face portion 13A1 may be provided as the deformation promoting structure, and may be applied to a configuration in which the drawing groove 13 does not have the extended groove structure L. Further, instead of the mountain face portion 13A1, the bottom face 13A of the drawing groove 13 may be provided as a valley face portion recessed in a valley shape.

Figure 9:
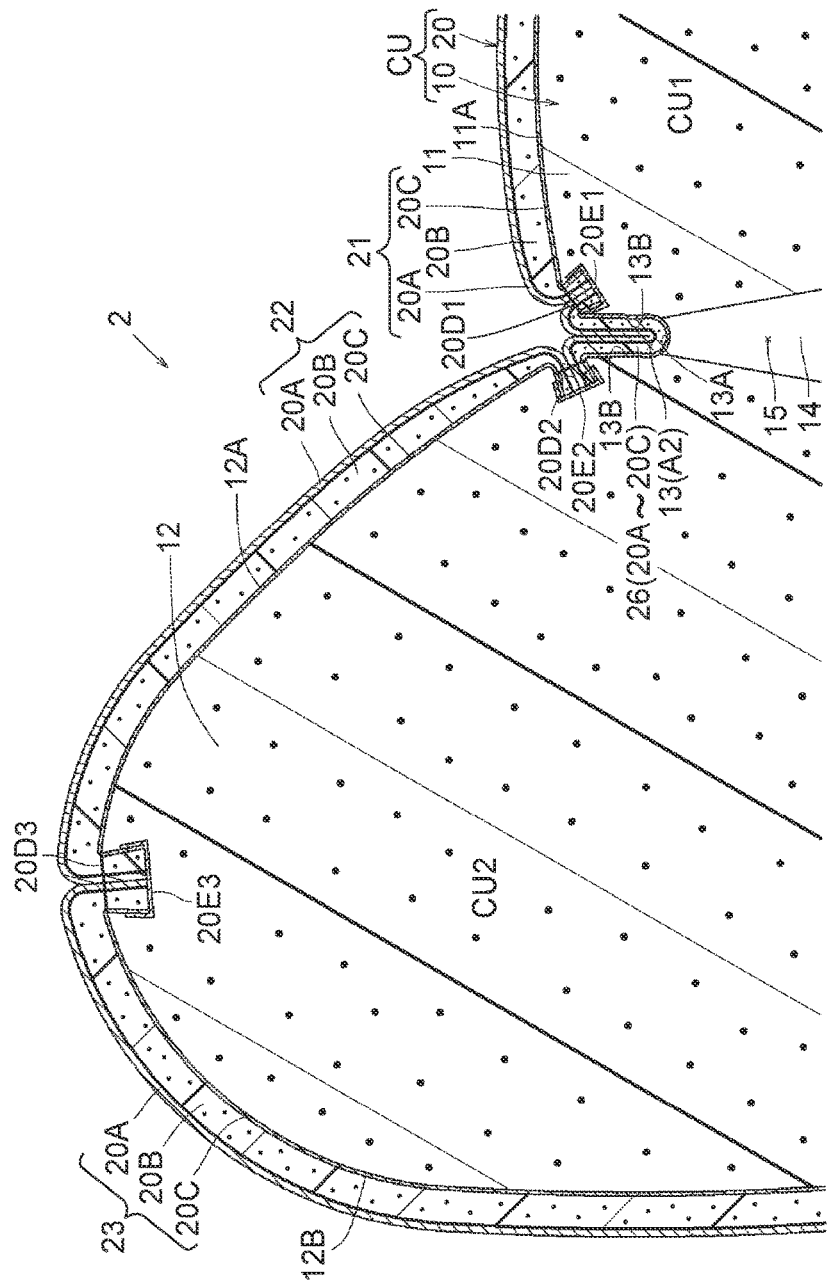
FIG. 9 is a sectional view corresponding to FIG. 3, FIG. 9 illustrating a structure of a main part of a cushion body of a fourth embodiment.

Subsequently a configuration of a cushion body CU of a fourth embodiment will be described with reference to FIGS. 9 to 10. In the present embodiment, as illustrated in FIG. 9, a cover piece of a back cover 20 (a seat cover), which is folded in a V-shape and drawn into a drawing groove 13, is constituted by one groove cover piece 26. The groove cover piece 26 has a three-layer cover structure including a covering material 20A made of synthetic leather, a laminating pad 20B made of urethane foam integrally surface-bonded to a back surface of the covering material 20A, and a back base fabric 20C made of non-woven fabric integrally surface-bonded to a back surface of the laminating pad 20B, similarly to the other cover pieces.

A back pad 10 (a seat pad) is configured such that a joining portion 14 that is located behind the drawing groove 13 and joins a main pad portion 11 (the other pad portion) to a side pad portion 12 (one pad portion) has a removal portion 15 having a shape obtained by removing a part of the joining portion 14 from a back side of the back pad 10 to a position at which the groove cover piece 26 covering the drawing groove 13 is reached. The removal portion 15 is formed such that the part of the joining portion 14 is continuously removed from the back side over a substantially entire intermediate region in a height direction in which a protruding amount of the side pad portion 12 is large. Note that the removal portion 15 may be formed such that the part of the joining portion 14 is intermittently removed from the back side in the intermediate region. Alternatively, the part of the joining portion 14 may be removed in only a part of the intermediate region, instead of the entire intermediate region. Here, the removal portion 15 may be regarded as the "deformation promoting structure" of the present invention.

Figure 10:
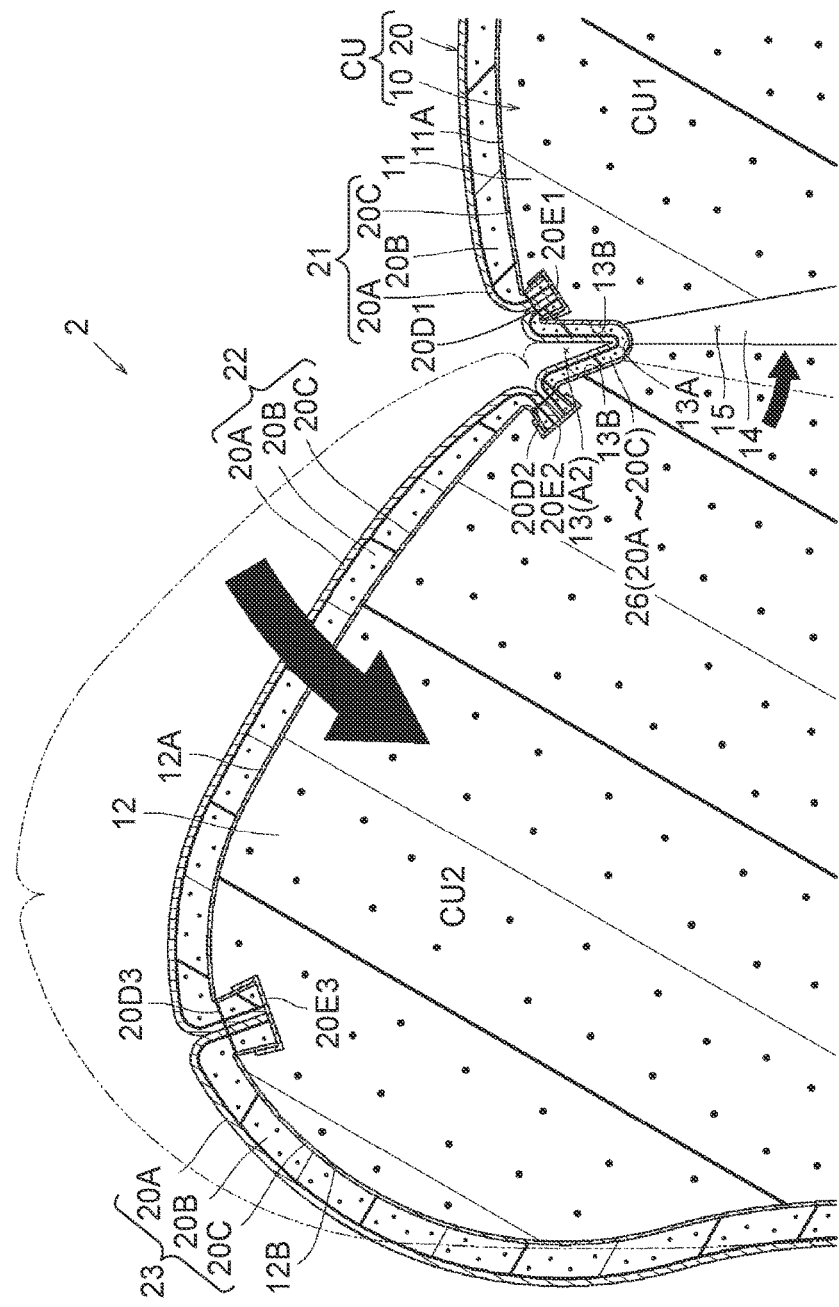
FIG. 10 is a sectional view illustrating a state where a side support portion is bent outward from the state illustrated in FIG. 9.

With this configuration of the cushion body CU, as illustrated in FIG. 10, an action of a deformation resistance of the joining portion 14 that receives a pushing load and obstructs the deformation at the time when the side pad portion 12 is pushed and bent outward with respect to the main pad portion 11 is decreased effectively by the removal portion 15, thereby allowing the side pad portion 12 to be easily bent outward. Note that, in the present embodiment, the removal portion 15 is formed in the joining portion 14 so as to promote the deformation, and therefore, the drawing groove 13 does not have the extended groove structure L (the deformation promoting structure) described in the first embodiment. However, the removal portion 15 (the deformation promoting structure) may be further formed in a configuration in which the extended groove structure L is applied to the drawing groove 13. The other configurations are the same as those of the cushion body CU described in the first embodiment, so the same reference signs are assigned to them and descriptions thereof are omitted.

Note that the removal portion 15 may not be formed in the shape obtained by removing the part of the joining portion 14 to the position at which the groove cover piece 26 covering the drawing groove 13 is reached. The reason is as follows: when at least a part of the joining portion 14 is removed, the joining portion 14 can be made vulnerable to easily promote the deformation, as compared to a configuration in which at least a part of the joining portion 14 is not removed. Further, the shape of the removal portion 15 is not limited in particular, and various shapes can be applied to the removal portion 15.

Figure 11:
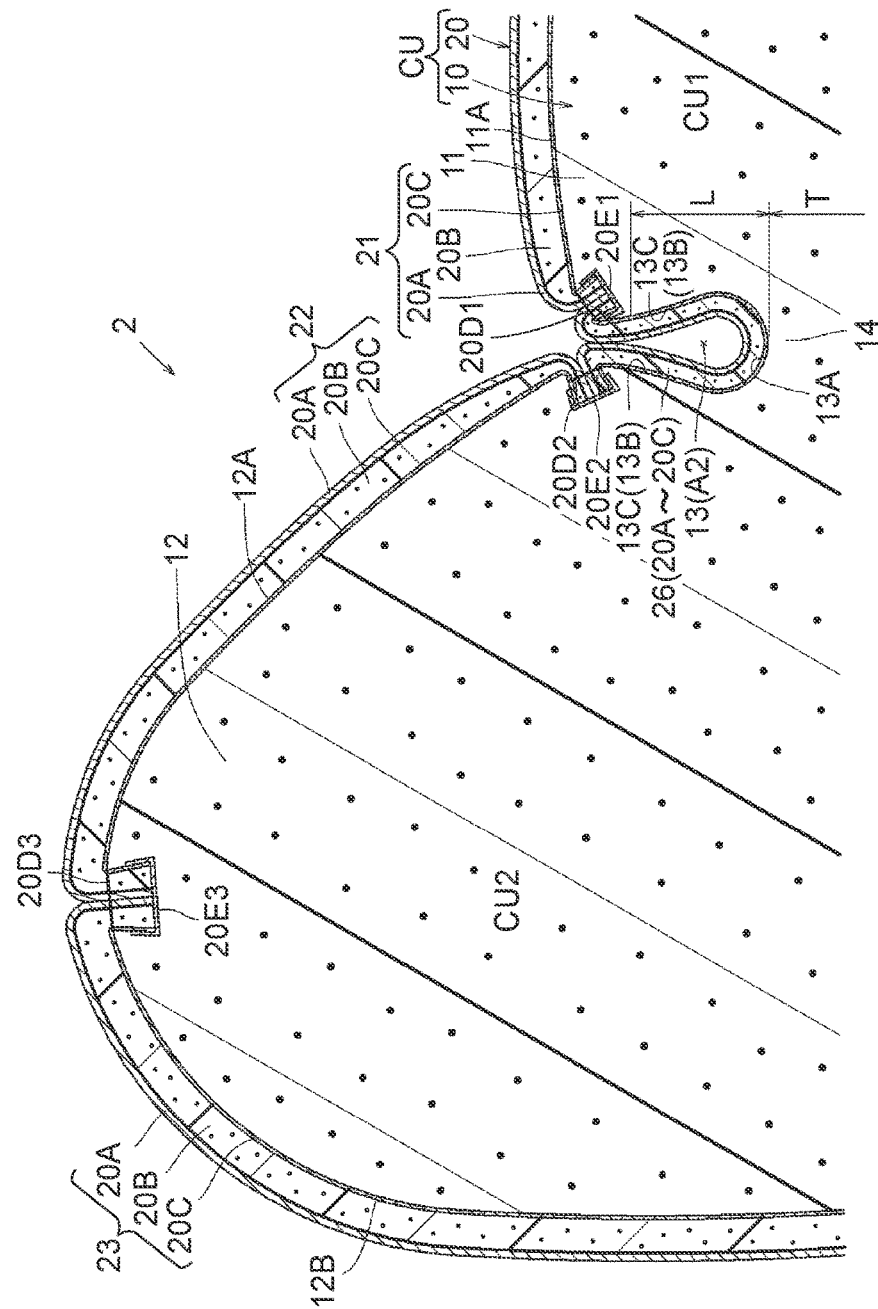
FIG. 11 is a sectional view corresponding to FIG. 3, FIG. 11 illustrating a structure of a main part of a cushion body of a fifth embodiment.
Figure 12:
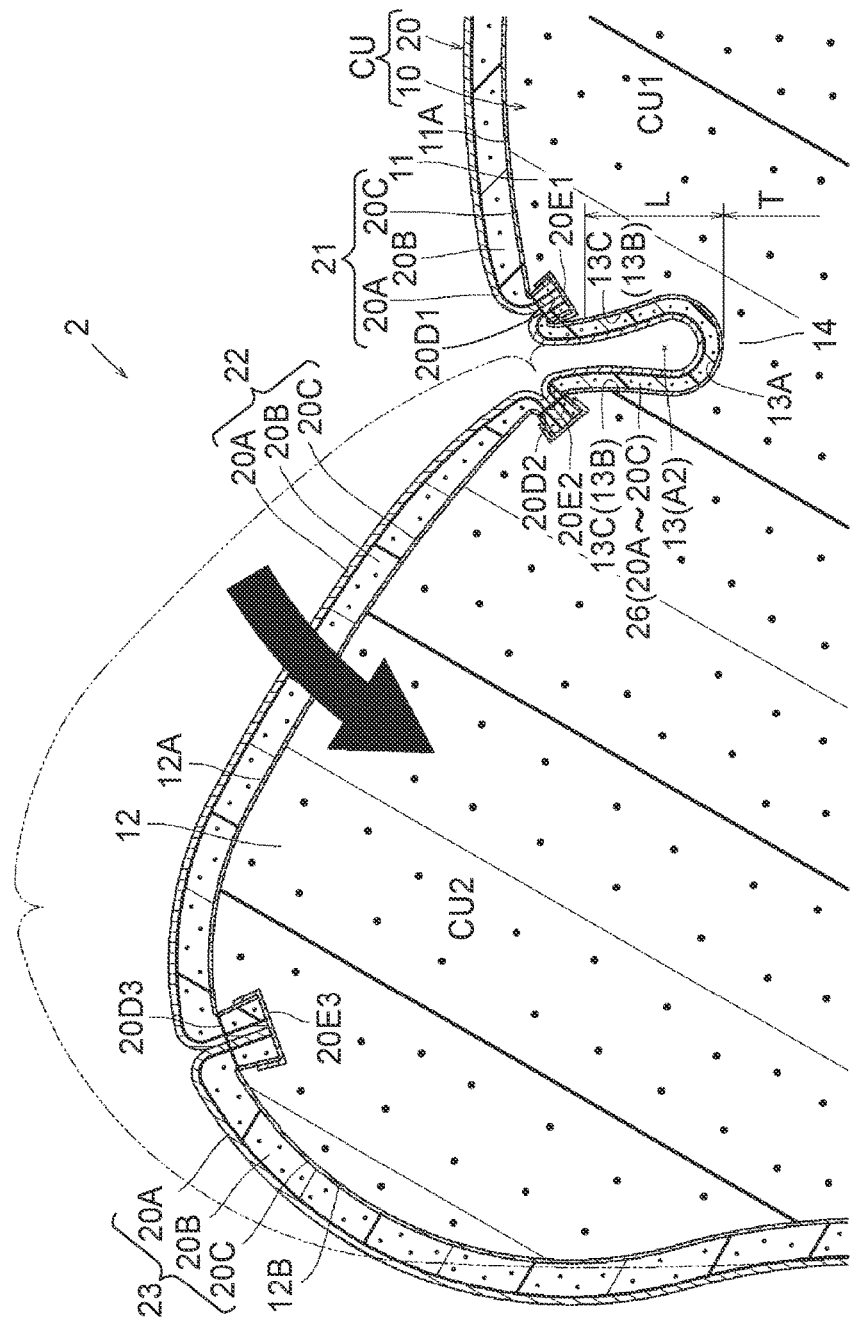
FIG. 12 is a sectional view illustrating a state where a side support portion is bent outward from the state illustrated in FIG. 11.

Subsequently a configuration of a cushion body CU of a fifth embodiment will be described with reference to FIGS. 11 to 12. In the present embodiment, as illustrated in FIG. 11, a cover piece of a back cover 20 (a seat cover), which is folded in a V-shape and drawn into a drawing groove 13, is constituted by one groove cover piece 26. The groove cover piece 26 has a three-layer cover structure including a covering material 20A made of synthetic leather, a laminating pad 20B made of urethane foam integrally surface-bonded to a back surface of the covering material 20A, and a back base fabric 20C made of non-woven fabric integrally surface-bonded to a back surface of the laminating pad 20B, similarly to the other cover pieces.

A back pad 10 (a seat pad) is formed to have a transverse sectional shape in which each side face 13B of the drawing groove 13 has a curved face portion 13C curved in a shape recessed outward in a groove-width direction over an entire region in a groove-depth direction. The curved face portion 13C is formed in a shape curved uniformly along a lengthwise direction in which the drawing groove 13 extends in a stripe shape. Further, along with this configuration, a part of the groove cover piece 26 on the side face 13B of the drawing groove 13 has a shape curved along the shape of the curved face portion 13C, and is provided so as to be integrally surface-bonded to the curved face portion 13C.

Thus, the cushion body CU is configured such that a peripheral length of the side face 13B of the drawing groove 13 is expanded in a groove-width direction due to a bulging shape of the curved face portion 13C, without changing a groove depth of the drawing groove 13 of the back pad 10. Note that the groove cover piece 26 covering the drawing groove 13 along the curved face portion 13C is also configured such that a peripheral length of the groove cover piece 26 is expanded along the curved face portion 13C. Accordingly, as illustrated in FIG. 12, the cushion body CU configured as described above has a configuration in which the peripheral length of the drawing groove 13 is expanded in the groove-width direction due to the curved face portion 13C, in addition to the deformation promoting structure having the extended groove structure L of the drawing groove 13. Thus, the side pad portion 12 (one pad portion) can be easily bent with respect to the main pad portion 11 (the other pad portion) in a direction where the groove depth of the drawing groove 13 is increased.

More specifically, at the time when the side pad portion 12 is bent outward with respect to the main pad portion 11, the side face 13B can be stretched so as to flatten (moderate) the curved shape of the curved face portion 13C. This appropriately decreases an action of a deformation resistance of a joining portion 14, thereby allowing the side pad portion 12 to be easily bent outward. The other configurations are the same as those of the cushion body CU described in the first embodiment, so the same reference signs are assigned to them and descriptions thereof are omitted.

Note that, in the present embodiment, the curved face portion 13C that expands the peripheral length of the drawing groove 13 in the groove-width direction is applied to the configuration in which the drawing groove 13 has the extended groove structure L (the deformation promoting structure). Due to the configuration of the curved face portion 13C, deformation of the cushion body CU is easily promoted. In view of this, the curved face portion 13C may be provided as the deformation promoting structure, and may be applied to a configuration in which the drawing groove 13 does not have the extended groove structure L. The curved face portion 13C may have a shape bulging inward in the groove-width direction, instead of the shape recessed outward in the groove-width direction. Further, the curved face portion 13C may be a shape waved in the groove-width direction.

The five embodiments of the present invention have been described above, but the present invention can be implemented in various embodiments other than the above embodiments. For example, the "cushion body" of the present invention can be widely applied to a configuration in which a seat cover covers a surface of a seat pad in a surface-bonded state in which a surface of the seat cover is bonded to the surface of the seat pad, and the cushion body is applicable to seats used in a vehicle other than the automobile, for example, a train, and other vehicles such as an aircraft and a vessel. Further, the cushion body of the present invention is also applicable to a chair for furniture. Further, the cushion body of the present invention is also applicable to various seat structural objects having a cushion structure such as a seat cushion, a headrest, an ottoman, and an arm rest, in addition to the seatback 2 in the seat Further, the seat cover is not limited to a seat cover that is integrally surface-bonded to a seat pad by a so-called covering-integrated foam molding method, and may be a seat cover that is integrally surface-bonded to a seat pad by an adhesive after foam molding of the seat pad is performed. Further, the seat cover is not limited to a seat cover made of synthetic leather, and may be a seat cover made of other leather materials such as genuine leather, or may be a seat cover made of various cover materials such as fabric and a net material made of three-dimensional knitting. Further, the groove cover piece drawn in the drawing groove of the seat cover may be constituted by a surface cover piece of the seat cover that covers the surface of the seat pad.

Further, as long as the drawing groove formed in the seat pad is configured such that the intermediate part of the seat cover is drawn into the drawing groove and the surface of the intermediate part of the seat cover is bonded to the drawing groove, the shape and the size of the drawing groove are not limited to a particular shape and a particular size. Further, the deformation promoting structure that allows the vicinity portion in the vicinity of the drawing groove of the seat pad to be easily bent may be configured such that the drawing groove is deepened or the removal portion is formed from the back side of the seat pad to reduce the thickness of the vicinity portion, or may be configured such that a hollow portion is formed in the vicinity portion or a slit is formed in the bottom face or the side face of the drawing groove so that the slit is opened (widened). However, in the case of the configuration in which the slit is widened, it is preferable that the seat cover covering the bottom face or the side face of the drawing groove having the slit should be a stretchable seat cover that permits the slit to be widened. Further, the deformation promoting structure may be configured by adjusting a pad density such that the finished vicinity portion in the vicinity of the drawing groove of the seat pad is soft as compared to the other portions of the seat pad. Further, the deformation promoting structure may be configured such that a region that is not surface-bonded to the seat cover is provided in a part of an inner peripheral surface of the drawing groove and the seat cover is provided in a non-contact state in this region, and thus, the seat pad is easily bent until the seat cover is stretched and tense.

What is claimed is:

1. A cushion body comprising:
    a seat pad; and
    a seat cover covering a surface of the seat pad in a state in which a surface of the seat cover is bonded to the surface of the seat pad, wherein
    the seat pad includes:
        a plurality of pad portions including at least a first pad portion and a second pad portion;
        a drawing groove into which an intermediate part of the seat cover is drawn such that a surface of the intermediate part of the seat cover is bonded to the drawing groove; and
        a deformation promoting structure configured to facilitate bending of a vicinity portion of the drawing groove so as to promote bending of the first pad portion with respect to the second pad portion in a direction in which a groove width of the drawing groove is increased, the first pad portion being separated from the second pad portion by the drawing groove, and
    wherein the seat cover includes surface cover pieces that respectively cover the first pad portion and the second pad portion, and at least one separate groove cover piece that covers side faces of the drawing groove.

2. The cushion body according to claim 1, wherein:
    the drawing groove is formed in a boundary portion between a main surface and a bolster surface in the seat pad;
    the main surface is configured to support, from a back side, a body of a seated occupant; and
    the bolster surface is configured to protrude with respect to the main surface such that an angle is formed between the bolster surface and the main surface, and to support the body of the seated occupant from a lateral side.

3. The cushion body according to claim 1, wherein a bottom face of the drawing groove is formed in a shape in which the bottom face is extended in a groove-height direction so as to expand a peripheral length of the drawing groove.

4. The cushion body according to claim 1, wherein a side face of the drawing groove extends in a groove-width direction so as to expand a peripheral length of the drawing groove.

5. The cushion body according to claim 1, further comprising a sewn portion in which cover pieces constituting the seat cover are sewn together, wherein the sewn portion is positioned on a bottom face of the drawing groove.

6. The cushion body according to claim 1, wherein:
    the drawing groove has a shallow region where a groove depth is relatively small and a deep region where the groove depth is relatively large as compared to the shallow region, in a lengthwise direction in which the drawing groove extends in a stripe shape;
    the deep region of the drawing groove has an extended groove structure in which the groove depth is extended as compared to the shallow region; and
    the deformation promoting structure includes the groove structure that facilitates bending of the first pad portion in the direction in which the groove width of the drawing groove is increased.

7. The cushion body according to claim 1, wherein:
    the at least one groove cover piece comprises two groove cover pieces,
    a sewn portion in which edge portions of the groove cover pieces are sewn together is provided on a bottom face of the drawing groove, the edge portions of the groove cover pieces being adjacent to each other;
    sewn portions are provided on corner surfaces of the drawing groove on an opening side; and
    in the sewn portions, opposite edge portions of the groove cover pieces are sewn to corresponding edge portions of the surface cover pieces that are respectively adjacent to the groove cover pieces.

8. The cushion body according to claim 1, wherein the surface cover pieces each comprises a multi-layer structure and each of the at least one separate groove cover piece comprises the multi-layer structure.

9. The cushion body according to claim 1, wherein the surface cover pieces each comprises a three-layer structure and each of the at least one separate groove cover piece comprises the three-layer structure.

10. The cushion body according to claim 1, wherein the at least one separate groove cover piece is arranged between two surface cover pieces in a seat cross-wise direction.

11. The cushion body according to claim 1, wherein the at least one separate groove cover piece comprises two separate groove cover pieces, and the two separate groove cover pieces are arranged between two surface cover pieces in a seat cross-wise direction.

* * * * *